US000001274H

United States Statutory Invention Registration [19]

[11] Reg. Number: H1274

Hwo

[43] Published: Jan. 4, 1994

[54] POLYPROPYLENE-POLYBUTYLENE HEAT SEALABLE LAMINATED PACKAGING FILM WITH IMPROVED OPTICS

[75] Inventor: Charles C. Hwo, Sugar Land, Tex.

[73] Assignee: Shell Oil Company, Houston, Tex.

[21] Appl. No.: 677,049

[22] Filed: Mar. 29, 1991

[51] Int. Cl.[5] ..... B32B 7/02

[52] U.S. Cl. ..... 428/214; 428/349; 428/355

[58] Field of Search ..... 428/349, 516

[56] References Cited

U.S. PATENT DOCUMENTS

| | | | |
|---|---|---|---|
| 4,125,662 | 11/1978 | Weiner et al. | 428/213 |
| 4,230,767 | 10/1980 | Isaka et al. | 428/349 |
| 4,291,092 | 9/1981 | Weiner | 428/349 |
| 4,297,411 | 10/1981 | Weiner | 428/349 X |
| 4,297,415 | 10/1981 | Ward et al. | 428/349 |
| 4,339,495 | 7/1982 | Weiner | 428/349 |
| 4,339,498 | 7/1982 | Weiner | 428/349 |
| 4,340,641 | 7/1982 | Weiner | 428/349 |
| 4,343,852 | 8/1982 | Isaka et al. | 428/216 |
| 4,677,025 | 6/1987 | Davison et al. | 428/349 |
| 4,681,804 | 7/1987 | Hwo | 428/349 |
| 4,720,420 | 1/1988 | Crass et al. | 428/349 X |
| 4,725,505 | 2/1988 | Hwo et al. | 428/349 X |
| 4,766,178 | 8/1988 | Hwo | 525/240 |
| 4,769,421 | 9/1988 | Hwo | 525/240 |
| 4,842,930 | 6/1989 | Schinkel et al. | 428/349 |
| 4,876,156 | 10/1989 | Hwo | 428/349 X |
| 4,921,749 | 5/1990 | Bossaert et al. | 428/349 X |
| 5,073,458 | 12/1991 | Hwo et al. | 428/516 |
| 5,075,157 | 12/1991 | Hwo et al. | 428/349 X |

FOREIGN PATENT DOCUMENTS 1570353 5/1965 Fed. Rep. of Germany .

*Primary Examiner*—Robert L. Stoll
*Assistant Examiner*—Joseph D. Anthony

[57] ABSTRACT

A packaging film comprising a core layer of polypropylene and a surface layer comprising a propylene ethylene random copolymer wherein at least one of said core or said surface layers contains a minor amount of a high melt index butylene homopolymer.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYPROPYLENE-POLYBUTYLENE HEAT SEALABLE LAMINATED PACKAGING FILM WITH IMPROVED OPTICS

BACKGROUND OF THE INVENTION

1. Field of the Invention

The invention relates to a multi-layer, thermoplastic heat-sealable film suitable for conventional heat sealable packaging applications.

2. Brief Description of the Prior Art

Polypropylene film has become a useful and widely accepted packaging film because of its good moisture barrier, stiffness, high strength, and good optical properties. However, the optical properties of polypropylene films in certain applications are sometimes critical and improvement has long been needed.

U.S. Pat. No. 4,230,767 discloses a laminated packaging material with heat seal packaging properties composed of a polypropylene base layer and a surface layer of a two component blend of a propylene/ethylene copolymer with a variety of other olefins and copolymers including polybutylene copolymers. U.S. Pat. No. 4,230,767 does not disclose the use of a high melt index polybutylene in a laminated film with a polypropylene core.

U.S. Pat. Nos. 4,681,804; 4,677,025; 4,769,421; 4,343,852; and 4,766,178 disclose laminated films containing polypropylene and polybutylene, however none disclose the use of high melt index polybutylene as presently claimed.

U.S. Ser. No. 531,206, filed May 31, 1990 now U.S. Pat. No. 5,073,458 discloses a laminated film having a polypropylene core which is coated with layers of a blend of polypropylene random copolymer and a high melt index poly-1-butene. Applicant has found that a laminate having a polypropylene core and polypropylene random copolymer outer layers gives films having surprisingly better optical properties when a minor amount of a high melt index poly-1-butene is added either to the core or to the outer layers.

SUMMARY OF THE INVENTION

The present invention is a novel multi-layer film composition having an unexpected combination of high tear strength, good processability, and improved optics. The film comprises a "core" or substrate of propylene homopolymer or copolymer or blends of propylene polymer with butene-1 homopolymers and copolymers. This core is coated on one or both sides with a propylene/ethylene random copolymer composition or a blend comprising a propylene/ethylene random copolymer and a low melt index butylene homopolymer or low melt index butylene/ethylene copolymer wherein a minor amount of a high melt index butylene homopolymer is blended with the core or the outer layer composition.

The film may be made by any conventional technique in which a skin layer, which is substantially an ethylene/propylene copolymer blend, may be applied to a core or base layer consisting substantially of polypropylene. Any of the known methods of coextrusion or of extrusion coating can be used to make this film.

The film-forming composition, or any component thereof, can be used unaltered or can be modified with additives for improvement of slip, antiblock or static properties of the finished film.

DESCRIPTION OF THE PREFERRED EMBODIMENT

Resins useful for the core layer of the present invention include low melt index propylene homopolymers and copolymers. The outer skin material may comprise a blend of a propylene/ethylene random copolymer optionally with a butene-1 homopolymer or copolymer and a minor amount of high melt index poly-1-butene homopolymer.

The polypropylene used in the present invention is any crystallizable polypropylene. Said polypropylene can be prepared by polymerizing propylene irrespective of the method used so long as crystallizable polypropylene is formed. The preferred polypropylenes are the substantially isotactic polypropylenes prepared by the Ziegler/Natta or $MgCl_2$-supported catalyst polymerization process.

The propylene polymers usable in the core layer can be either propylene homopolymers or copolymers. If propylene copolymers are used, they can be random or block copolymers with the comomoner content preferably 1–30 mole % of either ethylene, butene, or an alpha olefin having from 5 to 8 carbon atoms.

Propylene polymers useful for the core layer in the invention preferably have a melt index of less than 60, more preferably from about 1–15, as measured by ASTM D-1238, Condition L at 230° C. A particularly suitable propylene, has a melt index of 2.6 and is available from Shell Chemical Company, of Houston, Tex. as PP5A08.

The outer skin layers comprise a blend of a propylene-ethylene random copolymer, and optionally a low melt index butene-1 polymer and a high melt index butene-1 homopolymer.

The propylene-ethylene random copolymers have an ethylene content of 7% by weight or less and have a melting point of 130° C. or higher or preferably 150° C. or higher and a melt index of from 2 to 20 g/10 minutes, preferably 4 to 15 g/10 minutes, most preferably 6 to 10 g/10 minutes as measured by ASTM D-1238, Condition L at 230° C.

The low melt index butene-1 polymers referred to herein are substantially poly-1-butene homopolymers or copolymers containing at least 95%, preferably 97%, and most preferably 98% by weight of isotactic portions. Suitable poly-1-butenes have a density of 0.895–0.919.

Suitable poly-1-butenes can be obtained, for example, according to Ziegler-Natta low pressure polymerization of butene-1 as disclosed in German Published Application No. 1,570,353.

The butene-1 polymers usable in the outer layers are either butene-1 homopolymers or copolymers. If butene-1 copolymers are used, the non-butene comonomer content can be 0.1–20 mole % preferably 0.2–10 mole % or more preferably 0.3–6 mole % of either ethylene, propylene, or an alpha olefin having from 5 to 8 carbon atoms.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3 \cdot AlCl_3$ and $Al(C_2H_5)_2Cl$ at temperatures of 10°–50° C., preferably 20°–40° C., e.g. according to the process of German Published Application No. 1,570,353. High melt indices are then obtained by further processing the polymer by peroxide cracking. The poly-1-butenes may be modified to increase surface activity by reaction with, for example, maleic anhydride or other functional group.

The high melt index poly-1-butene referred to herein is a butene-1 polymer containing at least about 90%, preferably at least about 95%, and more preferably about 97%, by weight of isotactic portions. Useful in the present invention are isotactic poly-1-butenes having a low molecular weight, e.g. less than about 280,000 as determined by solution viscosity in "Decalin" (decahydronophthalene). Usable poly-1-butenes have a density of 0.895–0.925, preferably 0.905–0.920 and especially 0.910–0.915. Usable poly-1-butenes have melt indices in the range of from 20 to 1000, more preferably 30–650, more preferably 50–500, and most preferably 100–300 g/10 min. as determined by ASTM D-1238 Condition E, at 190° C. The intrinsic viscosity of the polybutylene may range from about 0.03 to about 0.20 preferably from about 0.06 to about 0.11 at 130° C. The Brookfield melt viscosity of the high melt index polybutylene may range from about 10,000 to about 200,000 centipoise, preferably 25,000 to 150,000 centipoise and most preferably from 40,000 to 100,000 centipoise at 200° C.

The laminate compositions may also contain additives and fillers, e.g. mold release agents, UV or thermal stabilizers, slip agents, antiblock agents, nucleating agents, pigments, antioxidants, or flame retardants.

Blending of the components can occur by one of several methods, dry tumble blending, masterbatch, or melt compounding techniques. The method of combining the ingredients of the formulation is important. For example, in most cases, it is desirable to use the least amount of energy to merge the components into an effective blend. Therefore, the preferred method of blending is dry blending the components in a powder form.

The coated thermoplastic film of the present invention may be formed by any conventional technique for producing a multi-layered film, for example: coextrusion, lamination of previously extruded films; extrusion coating; emulsion coating; and so forth. The preferred method is coextrusion, but it is not our intention to limit the means of production to any single technique.

The skin layer of the laminate structure embodied herein is usually 0.02 mil to 0.8 mil for every mil of total film thickness. Generally preferred is a skin of 0.05 mil to 0.6 mil and a total film thickness of 0.5 mil to 2.0 mils. The coating or skin may comprise from 3% to 30% of the total thickness of the laminated film.

The following Examples illustrate the invention but are not to be considered as limiting it.

EXAMPLES

Films were prepared by coextruding a core material of polypropylene homopolymer or polypropylene hompolymer blended with high melt index poly-1-butene with a coating on both sides thereof comprising a polypropylene random copolymer alone (control) or blends with other components as shown in Table I. The molten polymers were coextruded from a conventional extruder through a flat 10" sheet die, the melt streams being combined in an adaptor prior to being extruded from the die. Each skin layer comprised approximately ⅓ of the total thickness of the film. The resin was extruded at about 230° C. for the skin material and 225° C. for the core material and 235° C. for the die.

After leaving the die orifice, the coated sheets (about 18 mils in thickness) were rolled on a chilled roll at about 10° C. (50° F). The sheets were then trimmed and wound on cores. The sheets were then stretched by a biaxial film stretcher with 6 times in one direction and 5 times in the other direction.

Using this same basic procedure, films were prepared having the following compositions:

TABLE I

| # | Skin | FILM STRUCTURE Core | Skin | |
|---|---|---|---|---|
| 1. | PPR | PP | PPR | CONTROL |
| 2. | PPR | PP + 3% DP0800 | PPR | |
| 3. | PPR + 3% PB0B00 | PP | PPR + 3% DP0800 | |
| 4. | PPR + 40% PB8340 | PP | PPR + 40% PB8340 | CONTROL |
| 5. | PPR + 40% PB8340 | PP + 3% DP0800 | PPR + 40% PB8340 | |
| 6. | PPR + 40% PB8340 + 3% DP0800 | PP | PPR + 40% PB8340 + 3% DP0800 | |

The various materials used for the example films were as follows:

PPR is propylene random copolymer with an ethylene content of 5 wt % and a melt index of 8.0 available from Solvey as KS409.

PP is propylene homopolymer with a melt index of 2.2 g/10 min. at 230° C. and a density of 0.905, available from U.S. Steel Corp. as FF020Y.

PB8340 is a poly-1-butene copolymer with ethylene comonomer content of 0.75 wt % and a melt index of 4.0 g/10 min. at 190° C. and a molecular weight of 325,000 available from Shell Chemical Company, Houston, Tex.

DP0800 is a high melt index butene-1 homopolymer with a melt index of 200 g/10 min. at 190° C., molecular weight of 108,000, available from Shell Chemical Company, Houston, Tex.

The typical physical properties of the high melt index polybutylene (DP0800) are listed below in Table II.

TABLE II

Typical Physical Properties of DP0800 Polybutylene

| | ASTM Test Method | Unit English | Unit (Metric) | Polybutylene DP0800 |
|---|---|---|---|---|
| Melt Index | | | | |
| @ 190° C. | D1238 "E" | — | g/10 min | 200 |
| @ 230° C. | D1238 "L" | — | g/10 min | 490 |
| Density | D1505 | lb/ft | g/cms | 57.1 (0.915) |
| Tensile strength @ yield | D638 | psi | MPa | 2000 (13.8) |
| Tensile strength @ break | D638 | psi | MPa | 4200 (29.0) |
| Elongation at break | D638 | % | % | 350 |

TABLE II-continued

| Typical Physical Properties of DP0800 Polybutylene | | | | |
|---|---|---|---|---|
| | | Unit | | |
| | ASTM Test Method | English | (Metric) | Polybutylene DP0800 |
| Modulus of elasticity | D638 | psi | MPa | 35000 (241) |
| Hardness, Shore | D2240 | D scale | D scale | 55 (55) |
| Brittleness temperature | D746 | °F. | °C. | 0° (−18°) |
| Melting point range | DSC | °F. | °C. | 255–259° (124–126°) |
| Soft point, Vicat | D1525 | °F. | °C. | 241° (116°) |
| Thermal conductivity, at 77° F. | C177 | Btu/ft$^2$/hr/°F./in | Kcal/m$^2$ hr/°C./cm | 1.25 (16) |
| Melt Viscosity at 200° C. | Brookfield | centipoise | — | $3.9 \times 10^4$ |

Tables III and IV show the optical properties for the six sample films. Table III shows optical properties including gloss measured at an angle of 60°. Table IV shows optical properties including gloss, measured at an angle of 45°, of a second set of similarly prepared films. Films with surface layers, or a core layer, containing a minor amount of high melt index poly-1-butene, compositions 2, 3, 5 and 6, were processed very easily and had no handling problems since the surface was not tacky.

TABLE III

| OPTICAL PROPERTIES | | | |
|---|---|---|---|
| FILM COMPOSITION | THICKNESS MICRONS | HAZE % | GLOSS (@ 60°) |
| 1. Control | 13 | 0.4 | 113.1 |
| 2. | 27.5 | 0.2 | 127.1 |
| 3. | 15.5 | 0.2 | 130.0 |
| 4. Control | 15.5 | 0.4 | 111.3 |
| 5. | 24.5 | 0.3 | 136.5 |
| 6. | 15.5 | 0.4 | 131.1 |

TABLE IV

| OPTICAL PROPERTIES | | | |
|---|---|---|---|
| FILM COMPOSITION | THICKNESS MICRONS | HAZE % | GLOSS (@ 45°) |
| 1. Control | 13 | 0.5 | 80.0 |
| 2. | 27.5 | 0.39 | 81.0 |
| 3. | 15.5 | 0.43 | 81.5 |
| 4. Control | 15.5 | 1.87 | 69.5 |
| 5. | 24.5 | 0.55 | 77.0 |
| 6. | 15.5 | 0.88 | 81.0 |

As can be seen from this data, the laminated films of the present invention, i.e. Films 2, 3, 5 and 6 have significantly better optical properties than the control films 1 and 4 and do not have any problems associated with a tacky surface.

Certain changes in the above description of preparing the polymer blend and film may be made without departing from the scope of this invention and it is intended that all matter contained in this description is interpreted as illustrative and not in a limiting sense.

What is claimed is:

1. A multiple-layer, heat-sealable laminated film comprising:

(I) a core layer comprising propylene homopolymer and copolymers of propylene with from 1% to about 30% by weight of an α-olefin having 2 or 4 to 8 carbon atoms, (II) on at least one side of said core, an outer layer comprising a propylene-ethylene random copolymer having an ethylene content of 7% by weight or less, wherein at least one of said core or said outer layer contains from about 0.2% to about 10% by weight of a high melt index butene-1 homopolymer having a melt index of from about 20 to about 1000 g/10 minutes at 190° C.

2. The film of claim 1 wherein the high melt index butylene homopolymer has a melt index of from 30 to 650 g/10 minutes at 190° C.

3. The film of claim 1 wherein the high melt index butylene homopolymer has a melt index of from 50 to 300 g/10 minutes at 190° C.

4. The film of claim 1 wherein the high melt index butylene homopolymer has a melt index of from 100 to 200 g/10 minutes at 190° C.

5. The film of claim 1 wherein the high melt index butylene homopolymer has a melt viscosity of from 10,000 to about 200,000 centipoise at 200° C.

6. The film of claim 1 wherein the high melt index butylene homopolymer has a melt viscosity of from 40,000 to 100,000 centipoise at 200° C.

7. The laminated film of claim 1 wherein said outer layer is from about 0.02 mils to about 0.6 mils thick and the total film thickness is between 0.5 and 2.0 mils.

8. The laminated film of claim 1 wherein the film is formed by coextrusion.

9. A multiple-layer, heat-sealable laminated film comprising:

(I) a core layer comprising propylene homopolymers and copolymers of propylene with from 1% to about 30% by weight of an α-olefin having 2, or 4 to 8 carbon atoms, (II) on at least one side of said core, an outer layer comprising a blend of:

(a) from 40% to 80% by weight of a propylene-ethylene random copolymer having an ethylene content of 7% by weight or less, (b) from 20% to 60% by weight of a low melt index butene-1 polymer having a melt index of between 1.0 and 15 g/10 minutes at 190° C., and wherein at least one of said core or said outer layer contains from about 0.2% to about 10% by weight of a high melt index butene-1 homopolymer having a melt index of from about 20 to about 1000 g/10 minutes at 190° C.

10. The film of claim 9 wherein the outer layer comprises from 50 to 70% by weight of said propylene ethylene random copolymer, 30 to 50% by weight of said low melt index polybutylene and from 0.5 to about 5.0% by weight of said high melt index butylene homopolymer.

11. The film of claim 10 wherein the outer layer comprises from 55 to 65% by weight of said propylene ethylene random copolymer, 35 to 45% by weight of said low melt index polybutylene and from 2.0 to about 4.0% by weight of said high melt index butylene homopolymer.

12. A multiple-layer, heat-sealable laminated film comprising:

(I) a core layer comprising propylene homopolymers and copolymers of propylene with from 1% to about 30% by weight of an α-olefin having 2, or 4 to 8 carbon atoms, (II) on at least one side of said core, an outer layer comprising a blend of:

(a) from 55% to 65% by weight of a propylene-ethylene random copolymer having an ethylene content of 7% by weight or less, and a melt index of from 6 to 10 g/10 minutes at 230° C., (b) from 35% to 45% by weight of a low melt index butene-1 ethylene random copolymer having an ethylene content of from 0.3 to 20.0 mole % and a melt index of between 1.0 and 15 g/10 min. at 190° C., wherein at least one of said core or said outer layer contains from about 2% to about 4% by weight of a high melt index butene-1 homopolymer having a melt index of from 100 to about 300 g/10 minutes at 190° C., and a melt viscosity of between 40,000 and 100,000 centipoise at 200° C.

* * * * *